United States Patent [19]
Collin et al.

[11] Patent Number: 5,185,486
[45] Date of Patent: Feb. 9, 1993

[54] METHOD OF REDUCING THE BENZENE CONTENT OF GASOLINES

[75] Inventors: Jean-Claude Collin, Marsinval; Bernard Juguin, deceased, late of Rueil Malmaison by Sylve Juguin, executrix; Joseph Larue, Chambourcy; Alexandre Rojey, Garches, all of France

[73] Assignee: Institut Francais du Petrole, Rueil-Malmaison, France

[21] Appl. No.: 570,460

[22] Filed: Aug. 21, 1990

[30] Foreign Application Priority Data

Aug. 22, 1989 [FR] France .................. 89 11199

[51] Int. Cl.$^5$ .................. C07L 2/64; C07L 7/04; C07L 7/148
[52] U.S. Cl. .................. 585/448; 585/450; 585/467; 585/805; 585/807; 208/62; 208/92; 208/93; 208/95; 208/96
[58] Field of Search .................. 585/448, 446, 804; 208/85, 96, 62, 92, 93, 95

[56] References Cited

U.S. PATENT DOCUMENTS

| | | | |
|---|---|---|---|
| 2,396,966 | 3/1946 | Passino | 585/474 |
| 2,955,143 | 10/1960 | Bloch | 585/448 |
| 4,140,622 | 2/1979 | Herout | 585/448 |
| 4,209,383 | 6/1980 | Herout et al. | 585/448 |
| 5,120,890 | 6/1992 | Sachtler et al. | 585/449 |

FOREIGN PATENT DOCUMENTS 0456450  5/1949  Canada .................. 585/448

Primary Examiner—Anthony McFarlene
Attorney, Agent, or Firm—Millen, White, Zelano and Branigan

[57] ABSTRACT

The benzene content of hydrocarbon gasolines is accomplished by (a) fractionating at least one hydrocarbon gasoline into a light fraction A, with an increased benzene content, and a heavy fraction B, with a reduced benzene content; (b) contacting the light fraction A at a temperature below room temperature with a gas containing at least a fraction of olefins in which the number of carbon atoms is from 2 to 5 per molecule so that at least a fraction of said olefins is absorbed in light fraction A; at the end of stage (b), separating a residual gas with a reduced olefin content from a liquid fraction C, with an increased olefin content; (d) passing the fraction C from stage (c) into an alkylation reactor so that at least a fraction of the benzene is alkylated by at least a fraction of the olefins; (e) fractionating the mixture emerging from stage (d) so as to produce, firstly, a gas phase chiefly comprising gases which were not converted during stage (d) and, secondly, a liquid phase, at least partly containing the non-alkylated benzene and alkylbenzenes; and (f) mixing the liquid phase from stage (e) with the heavy fraction B from stage (a).

17 Claims, 2 Drawing Sheets

METHOD OF REDUCING THE BENZENE CONTENT OF GASOLINES

BACKGROUND OF THE INVENTION

The invention concerns a method of reducing the benzene content of gasolines. Governments worldwide and chiefly in Europe are in fact going to legislate for reduction or even complete removal of the benzene content of hydrocarbon gasolines and particularly reformates (catalytic reformates) for public health reasons.

SUMMARY OF THE INVENTION

The method of the invention makes it possible to reduce or even remove the benzene content of gasolines, by alkylating the benzene contained in the gasoline with olefins extracted from a gas. It has already been envisaged to alkylate the benzene directly with a gas containing olefins, by passing gasolines mixed with all the gas into the alkylating reactor. This system has the following disadvantages:

the reagents are diluted, resulting in an increase in the size of the equipment and a serious loss in the efficiency of the alkylating reaction, since the alkylating pressure is conventionally from 2-10 MPa, it is necessary under these conditions to compress all the gas to the required pressure level.

DETAILED DESCRIPTION OF THE DRAWINGS

Figure 1:
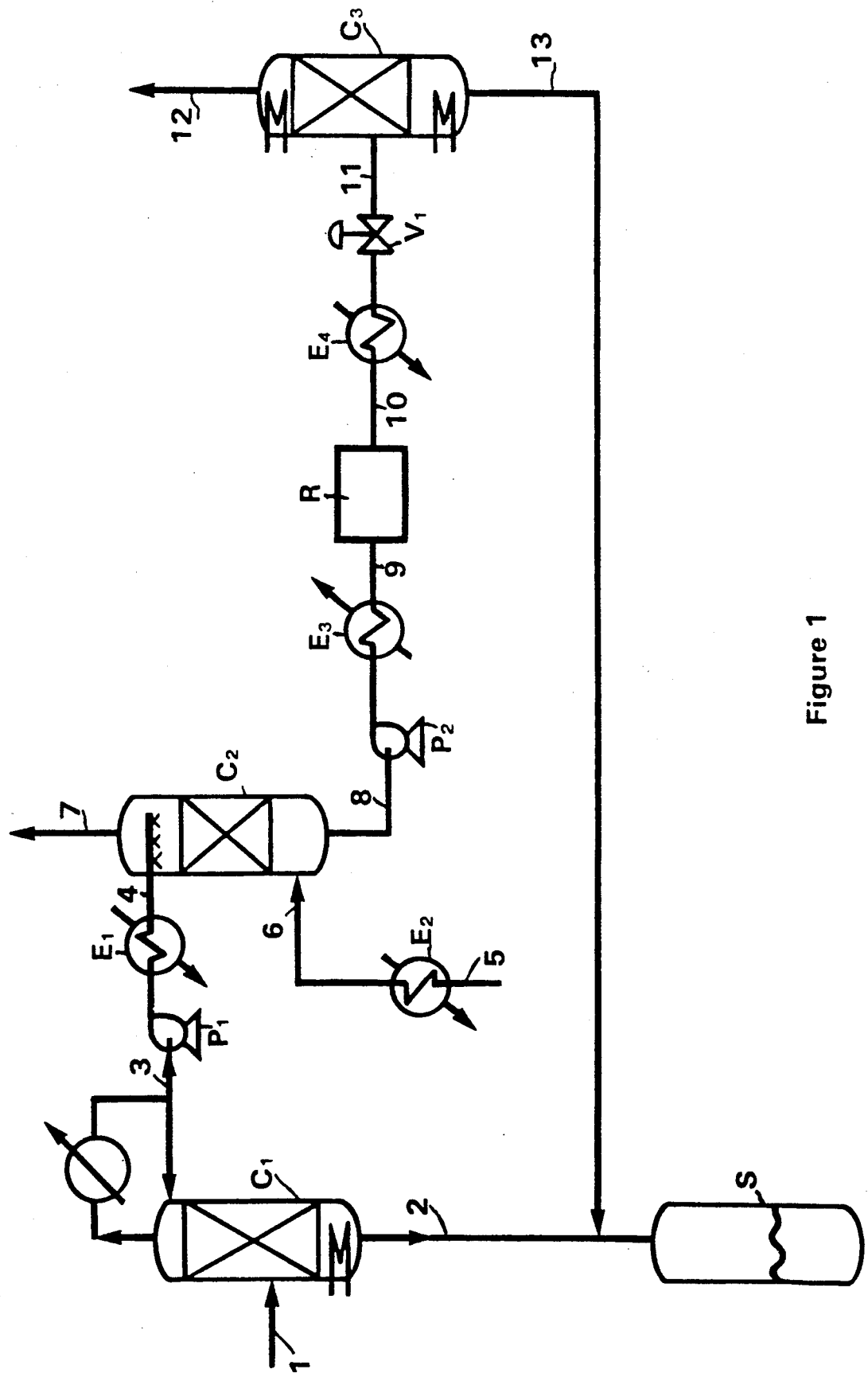
FIGS. 1 and 2 are schematic illustrations of comprehensive embodiments of the invention, with the embodiment of FIG. 2 accomplishing the removal of residual benzene.

The method of the invention avoids these disadvantages. It is illustrated by the diagram in FIG. 1. The reforming effluent containing benzene arrives through the pipe 1 and is fractionated in the distillation column C1 into two parts:

a heavy fraction B which is discharged from the bottom of the column C1 to the pipe 2; the fraction B has a reduced benzene content, a light fraction A which is discharged from the top of the column C1 through 21 along pipes 3a, 3b and 3; the fraction A has an increased benzene content (there is partial recycling to C1 through 3c).

The operating conditions in the column Cl are chosen so that the fraction B preferably contains less than 5% by weight of the benzene which is contained in the reforming effluent entering the column C1.

The light fraction A is pumped by the pump P1, cooled in the heat exchanger E1 to a temperature below room temperature, and passed through the pipe 4 into the absorption column C2, in which it is put into contact with a gas containing olefins. The gas containing olefins arrives through the pipe 5 and enters the colum 2 through the pipe 6, having been previously cooled in the heat exchanger E2 to a temperature below room temperature and close to the intake temperature of the light fraction A. In the column C2 part of the olefins in the gas are absorbed in the light fraction A, and the gas with a reduced olefin content leaves the column C2 through the pipe 7. When the light fraction A has absorbed at least part of the olefins in the gas, it leaves the column C2 through the pipe 8 and forms the liquid fraction C. The liquid fraction C is pumped to a higher pressure by the pump 2 and heated in the exchanger E3; it enters the alkylation reactor R through the pipe 9.

In the reactor R the benzene is alkylated by the olefins, leading to the formation of alkylbenzenes. The mixture leaving the reactor R through the pipe 10 is cooled in the heat exchanger E4. Its pressure is reduced to close to atmospheric in the valve V1, and it enters the fractionating column C3 through the pipe 11.

In the column 3 the non-converted gases are separated from the other constituents. The non-converted gases leave the column C3 through the pipe 12. The other constituents, containing particularly alkylbenzenes and non-converted or residual benzene involved in the alkylation reaction, leave the column C3 in liquid phase through the pipe 13. The liquid phase is mixed with the heavy fraction B from the column C1 and passed to the gasoline storage tank S via the pipe 14.

The method of the invention is characterized in that it comprises the following stages:

a) fractionating a reforming effluent into a light fraction A with an increased benzene content and a heavy fraction B with a reduced benzene content, b) placing said light fraction A into contact, at a temperature below room temperature, with a gas containing at least a fraction of olefins in which the number of carbon atoms is from 2 to 5 per molecule, so that at least a fraction of said olefins is absorbed in said light fraction A, c) at the end of stage (b) separating a residual gas with a reduced olefin content from a liquid fraction C with an increased olefin content, d) passing the fraction C from stage (c) into an alkylation reactor, so that at least a fraction of the benzene is alkylated by at least a fraction of the olefins, e) fractionating the mixture emerging from stage (d) so as to produce, firstly, a gas phase chiefly comprising gases which were not converted during stage (d) and, secondly, a liquid phase at least partly containing the non-alkylated benzene and alkylbenzenes, and f) mixing the liquid phase from stage (e) with the heavy fraction B from stage (a).

The benzene content of the reforming effluent may vary according to its source. It is generally less than 10% by weight. Operating conditions in column C1 should be selected so that the fraction B contains preferably less than 5% by weight of the benzene contained in the reforming effluent which enters the column C1. With a view to obtaining the lowest possible benzene content in the final gasoline, it is in fact advantageous to carry out the separation in the column C1 so as to minimize the benzene content of the heavy fraction B, which is passed directly into the gasoline.

The gas passing through the pipe 5 may come from various petrochemical units, such as a catalytic cracking or steam cracking unit or the like, and its olefin content should preferably be from 10 to 25% by weight. Most of the olefins are in the form of ethylene, propylene and a smaller quantity of butenes. The other constituents of the gas are essentially alkanes with 1 to 5 carbon atoms per molecule, hydrogen and nitrogen. The gas may further contain smaller proportions of other gases such as carbon dioxide and carbon monoxide.

The pressure of the gas is generally from 0.5 to 2 MPa. One of the advantages of the method of the invention is that the olefins can be absorbed in the light fraction A without any need for a recompression stage.

Consequently the pressure at absorption stage (b) of the process is from 0.5 to 2 MPa.

In the exchangers E1 and E2 the fraction A and the gas are each cooled so as to encourage absorption of the olefins from the gas in the liquid fraction. The refrigerating temperature is preferably from 10° to −40° C.

The absorption stage (b) of the method of the invention may be carried out in various ways. The column C2 may be a plate-type or packing type contactor. The most widely used technique is adiabatic absorption. However, absorption may be carried out in a quasi-isothermal arrangement, e.g., either in a plate-type column which is cooled by heat exchangers integral with the plates, or in a column where the liquid phase is drawn off from a plurality of plates, cooled in a heat exchanger by an external flow and reinjected onto said plate.

The absorption stage may be carried out isothermally by any other means known in the art.

At the alkylation stage (d) the molar ratio of benzene/olefin must preferably be from 0.5 to 2:1. For this purpose the operating conditions at absorption stage (b) may be arranged so that this ratio is satisfied in respect of the mixture entering the alkylation reactor. Should the quantity of benzene be too small however, benzene can be added to the benzene-rich fraction A before it enters the alkylation reactor. The added benzene may come either from a unit outside the process of the invention, or from part of the light fraction A passing through the pipe 3; in this case, part is passed to the absorption column C2, and the other part is mixed with the products travelling through the pipe 8.

The alkylation reaction may be carried out by any of the methods known in the art, for example by using a catalyst. The catalyst may be in the form of dealuminated mordenite or faujasite.

The pressure conditions for the reaction are generally from 2 to 10 MPa. This pressure is generally higher than that at which the gas containing the olefins is available. In the case of the process of the invention, the mixture entering the reactor is brought to the reaction pressure by the pump P2, without any need to use a compressor.

Refrigerated absorption requires a refrigeration source, which may be supplied by an external refrigeration cycle by a method known in the art. In the case of the process according to the invention, however, it is possible to produce at least part of the required refrigeration. For this purpose the residual gas phase travelling through the pipe 7 from stage (c) is brought to a lower pressure in a pressure reducing turbine. This produces, firstly, mechanical energy on the turbine shaft and, secondly, refrigerating energy. The refrigerating energy is produced by heating the gas leaving the turbine to a temperature close to room temperature.

Since the alkylation reaction requires an excess of benzene relative to olefins, the gasoline has a residual benzene content. This residual content may be virtually removed in a further developed version of the process, which is illustrated by the diagram in FIG. 2.

Figure 2:
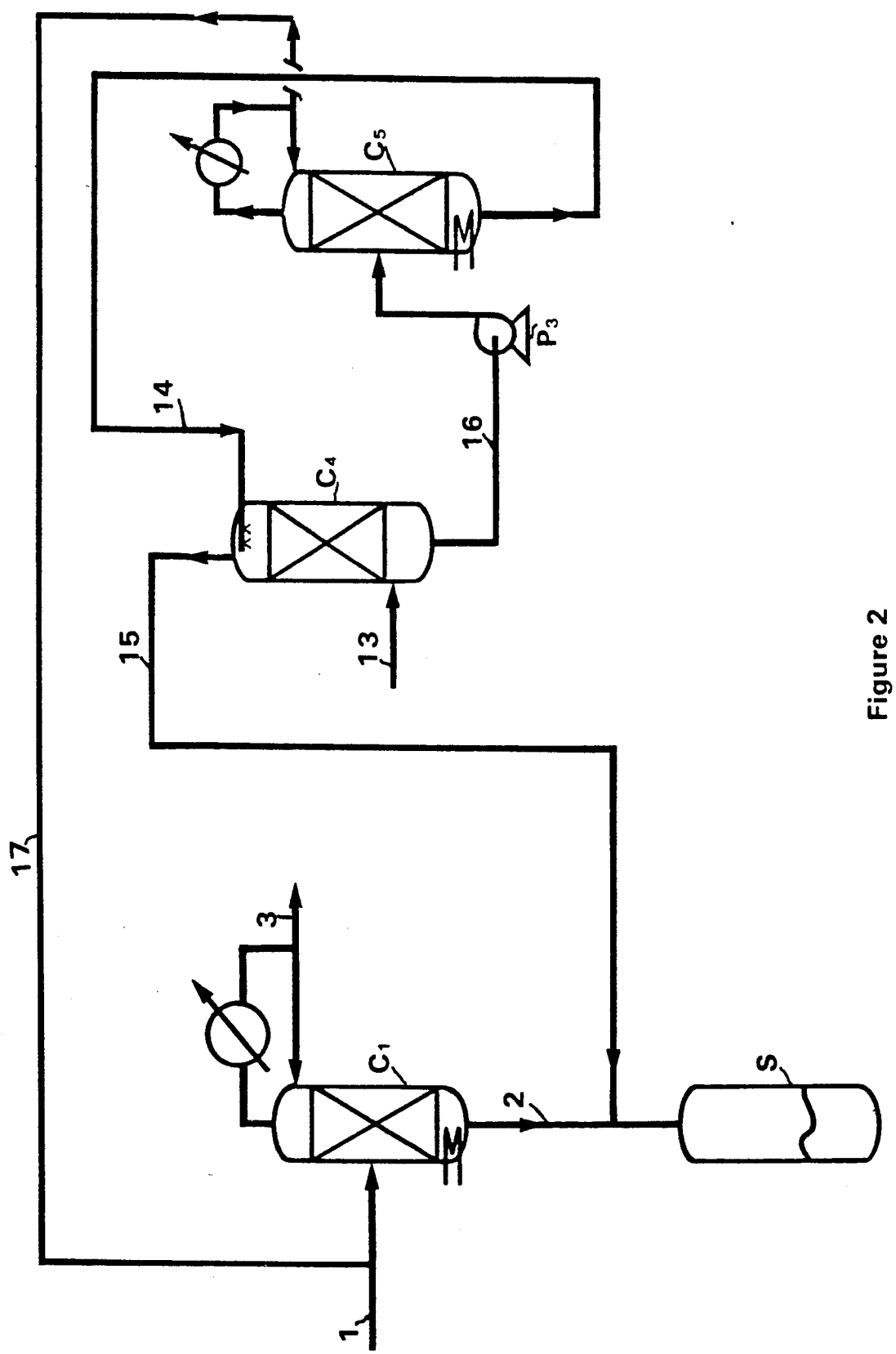

Like FIG. 1, FIG. 2 illustrates an embodiment of the invention, but without limiting the invention to these particular forms. A person skilled in the art can make various modifications to the diagrams in these figures without going beyond the scope of the invention.

FIG. 2 shows the distillation column Cl, the storage tank S and the additional equipment involved in the further developed version of the process. The equipment located between pipes 3 and 14 is the same as in FIG. 1. The liquid phase from column C3 is formed partly by the light fraction A, with alkylbenzenes and residual benzene added to it. Here it is directed by the pipe 13, not the gasoline storage tank but first into a column C4. This column may be a liquid-liquid extractor or a distillation column which can carry out extractive distillation. To facilitate an understanding of this further developed version of the process, the column C4 will be taken to be a liquid-liquid extractor. The liquid phase which enters the extractor C4 through the pipe 13 is placed into contact with a selective solvent, which enters the extractor through the pipe 18. The aromatic compounds are extracted by the solvent in the extractor C4, to give:

a refined phase which leaves the column C4 through the pipe 15, largely comprising the constituents of the mixture which enters through the pipe 13, depleted of most of the aromatic compounds. Said refined phase is mixed with the heavy fraction B from column Cl and passed to the petrol store S through pipe 14.

an extracted phase which leaves the column C4 through the pipe 16, largely comprising the solvent which enters through the pipe 18, enriched with aromatic compounds extracted from the refined product.

The extracted phase is pumped by the pump P3 and injected into the distillation column C5 to regenerate the solvent. The solvent leaves the column C5 through the pipe 18 and (is) recycled to the extractor E4. The aromatic constituents leave the column C5 through the pipe 17 and are mixed with the reforming effluent which comes in at stage (a) through the pipe 1.

Thus the effluent is enriched with alkylbenzenes and with non-converted benzene. They are fractionated in the column Cl. The benzene is carried away in the light fraction A (and thus treated according to the invention), and the alkylbenzenes are carried away in the heavy fraction B.

In this further developed version of the process of the invention, the aromatic constituents of the liquid mixture from stage (e) are treated by a selective solvent in an extraction stage, so as to produce a refined phase and an extracted phase. The refined phase, which contains no aromatic constituents or solvent, is mixed with the heavy fraction B from stage (a). The extracted phase, which contains the solvent and the aromatic constituents, is fractionated so as to produce the solvent and the aromatic constituents separately. The solvent is recycled to the extraction stage, and the aromatic constituents are mixed with the reforming effluent which enters at stage (a).

The extraction phase may be carried out either by liquid-liquid extraction or by extractive distillation. The extraction solvent is selected according to the method used; it may be chosen e.g. from the following constituents, from a mixture of a plurality of them or from a mixture of some of them with water: dimethylformamide, dimethylsulphoxide, n-methylpyrrolidone, sulphur dioxide, sulfolane, diglycolamine, n-formylmorpholine, diethyleneglycol, triethyleneglycol and tetraethyleneglycol.

The principle of the method of the invention is illustrated by Example 1.

EXAMPLE

In this example the procedure shown in FIG. 1 is followed. The reforming effluent has a benzene content of 5.91% by weight. Its density at 20° C. is 0.787 and its flow rate 15,063 kg/h. It enters the plate-type distillation column C1 through the pipe 1 and is fractionated into two parts:

a heavy fraction B (final boiling point 85° C.) which emerges from the bottom of the column C1 through the pipe 2; its flow rate is 10,243 kg/h, its benzene content less than 0.05% by weight and its density at 20° C. is 0.838.

a light fraction A (initial boiling point 85° C.) which emerges from the top of the column C1 through the pipe 3; its flow rate is 4,820 kg/h, its benzene content 18.47% by weight and its density at 20° C. is 0.687.

| | |
|---|---|
| Hydrogen | 0.46 |
| Carbon monoxide | 4.47 |
| Carbon dioxide | 0.36 |
| Nitrogen | 15.03 |
| Oxygen | 0.26 |
| Methane | 23.30 |
| Ethylene | 16.41 |
| Ethane | 23.62 |
| Propylene | 5.85 |
| Propane | 2.89 |
| Butanes | 4.99 |
| Pentanes | 2.26 |
| | 100.00% |

The gas arrives through the pipe 5, is cooled to temperature of −30° C. in the heat exchanger E2 and enters the column C2 through the pipe 6. The column C2 is fitted with a packing, and in it part of the olefins are absorbed from the gas in the light fraction A. The gas which has lost the olefins leaves the column C2 through the pipe 7 at a temperature of −26° C.; it contains only 1.37% of olefins and its flow rate is 369 kg/h.

The light fraction A, which has absorbed 97.5% by weight of the olefins from the gas, forms the liquid phase C, which leaves the column C2 at a temperature of −11° C. through the pipe 8. Its flow rate is 5,448 kg/h, and its composition gives a molar ratio of benzene/olefins of 1.76:1, which meets the conditions required for the alkylation phase.

The liquid phase C is pumped to a pressure of 4.5 MPa by the pump P2, heated to a temperature of 250° C. in the heat exchanger E3, and enters the alkylation reactor R through the pipe 9.

In the reactor R the benzene is alkylated by the olefins, leading to 90% conversion of ethylene to ethylbenzene and 100% conversion of propylene to propylbenzene. The mixtures leaving the reactor R through the pipe 10 has a flow rate of 5,448 kg/h. It is cooled to a temperature of 100° C. in the heat exchanger E4, and its pressure is reduced to 0.15 MPa in the valve V1. It enters the fractionating column C3 through the pipe 11.

The mixture is separated into two fractions in the column C3:

1) a gas fraction of 402 kg/h, essentially comprising non-converted gases which are drawn out through the pipe 12 at a temperature of −10° C., 2) a liquid fraction of 5,046 kg/h, particularly containing the alklbenzenes and residual benzene involved in the alkylation reaction, which leave the column C3 at a temperature of 59.0° C. through the pipe 13.

This liquid fraction is mixed with 10,243 kg/h of the heavy fraction B emanating from column C1, and passed to the gasoline storage tank S.

15,289 kg/h of gasoline is obtained in this way, giving a 1.5% increase in output. The increase is due to the constituents of the gas, and more particularly to the olefins, which are absorbed in the light fraction A during the absorption phase.

The benzene content of the gasoline thus obtained is reduced from 5.91 to 2.5% by weight, giving a 57% by weight reduction.

We claim:
1. A method of reducing the benzene content of hydrocarbon gasolines, comprising the steps of:
   a) fractionating at least one hydrocarbon gasoline into a light fraction A with an increased benzene content and a heavy fraction B with a reduced benzene content,
   b) placing said light fraction A into contact, at a temperature below room temperature, with a gas containing at least a fraction of olefins in which the number of carbon atoms is from 2 to 5 per molecule, so that at least a fraction of said olefins is absorbed in said light fraction A,
   c) at the end of stage (b) separating a residual gas with a reduced olefin content from a liquid fraction C with an increased olefin content,
   d) passing the fraction C from stage (c) into an alkylation reactor, so that at least a fraction of the benzene is alkylated by at least a fraction of the olefins,
   e) fractionating the mixture emerging from stage (d) so as to produce, firstly, a gas phase chiefly comprising gases which were not converted during stage (d) and, secondly, a liquid phase at least partly containing the non-alkylated benzene and alkylbenzenes,
   f) mixing the liquid phase from stage (e) with the heavy fraction B from stage (a).

2. The method of claim 1, wherein the temperature and pressure conditions for the absorption stage (b) are selected so as to obtain a molar ratio of benzene/olefins of from 0.5 to 2:1.

3. The method of claim 1, wherein the absorption stage (b) is carried out at a pressure below that for the alkylation stage (d).

4. The method of claim 1, wherein the temperature for the absorption stage (b) is from 10° to −40° C.

5. The method of claim 1, wherein the pressure for the absorption stage (b) is from 0.5 to 2 MPa.

6. The method of claim 1, wherein the alkylation stage (d) is carried out with a catalyst of dealuminated mordenite or dealuminated faujasite.

7. The method of claim 1, wherein the absorption stage (b) is carried out isothermally.

8. The method of claim 7, wherein the isothermal absorption stage is carried out in a plate column cooled by heat exchangers which are integral with the plates of the column.

9. The method of claim 7, wherein the isothermal absorption stage is carried out in a plate column, where the liquid phase on each plate is drawn off, cooled in a heat exchanger by an external flow and reinjected onto said plate.

10. The method of claim 1, wherein the residual gas phase emanating from stage (c) is brought to a lower pressure in a pressure reducing turbine, thereby producing mechanical energy.

11. The method of claim 10, wherein the gas leaving the pressure reducing turbine is heated so as to recover refrigerating energy.

12. The method of claim 1, wherein the gas used at stage (b) comes from a catalytic cracking unit.

13. The method of claim 1, wherein the aromatic constituents of the liquid mixture from stage (e) are treated by a selective solvent in an extraction stage, so as to produce a refined phase and an extracted phase; the refined phase, which contains no aromatic constitutents, being mixed with the heavy fraction B from stage (a); the extracted phase, which contains the solvent and the aromatic constitutents, being fractionated so as to recover the solvent and the aromatic constitutents separately; the solvent being recyled to the extraction stage, and the aromatic constituents being mixed with the hydrocarbon gasoline which enters at stage (a).

14. The method of claim 13, wherein the extraction stage is an extractive distillation process.

15. The method of claim 13, wherein the extraction stage is a liquid-liquid extraction process.

16. The method of claim 1 wherein said at least one hydrocarbon gasoline in step (a) is the benzene content of an effluent from catalytic reforming.

17. The method of claim 1, wherein the pressure for the absorption stage (b) is from 0.5 to 2 MPa.

* * * * *